United States Patent [19]

Turvill et al.

[11] Patent Number: 5,380,067
[45] Date of Patent: Jan. 10, 1995

[54] CHEST HARNESS FOR USE IN A CHILD RESTRAINT SYSTEM

[75] Inventors: William W. Turvill, Almont; Bob L. McFalls, Shelby Township, Macomb County, both of Mich.

[73] Assignee: TRW Vehicle Safety Systems Inc., Lyndhurst, Ohio

[21] Appl. No.: 6,738

[22] Filed: Jan. 21, 1993

[51] Int. Cl.⁶ .......................................... B60R 22/10
[52] U.S. Cl. ................................. 297/484; 297/468; 24/615
[58] Field of Search ............... 297/464, 468, 483, 484, 297/471, 472; 40/640; 24/695 B, 170, 605, 615; 116/281, 283

[56] References Cited

U.S. PATENT DOCUMENTS

| | | |
|---|---|---|
| 3,768,862 | 10/1973 | Williams, Jr. |
| 3,840,849 | 10/1974 | Lohr ............................ 297/468 X |
| 4,758,020 | 7/1988 | Boyd. |
| 4,800,629 | 1/1989 | Ikeda ........................... 297/483 X |
| 4,825,515 | 5/1989 | Wolterstorff, Jr. ............ 24/615 X |
| 4,977,650 | 12/1990 | Ida ............................... 24/615 X |
| 4,991,272 | 2/1991 | Bianchi ......................... 24/615 X |

FOREIGN PATENT DOCUMENTS

0519296A1 12/1992 European Pat. Off. .
WO92/17731 10/1992 WIPO .

*Primary Examiner*—Kenneth J. Dorner
*Assistant Examiner*—Milton Nelson, Jr.
*Attorney, Agent, or Firm*—Tarolli, Sundheim & Covell

[57] ABSTRACT

A connector assembly includes a buckle member (46) which interconnects with a tongue member (48) to position shoulder belts relative to a child in a vehicle. An indicator (72) connected to the tongue member has a first portion (74) of red color and a second portion (76) of green color. The buckle member has an opening (100) through which the first and second portions of the indicator are exposed to view as the buckle and tongue members are interconnected. As the buckle and tongue members (46, 48) are interconnected, the first portion (74) of red color is initially exposed through the opening (100) and then the second portion (76) of green color is exposed through the opening to indicate that the buckle and tongue members are securely interconnected.

15 Claims, 2 Drawing Sheets

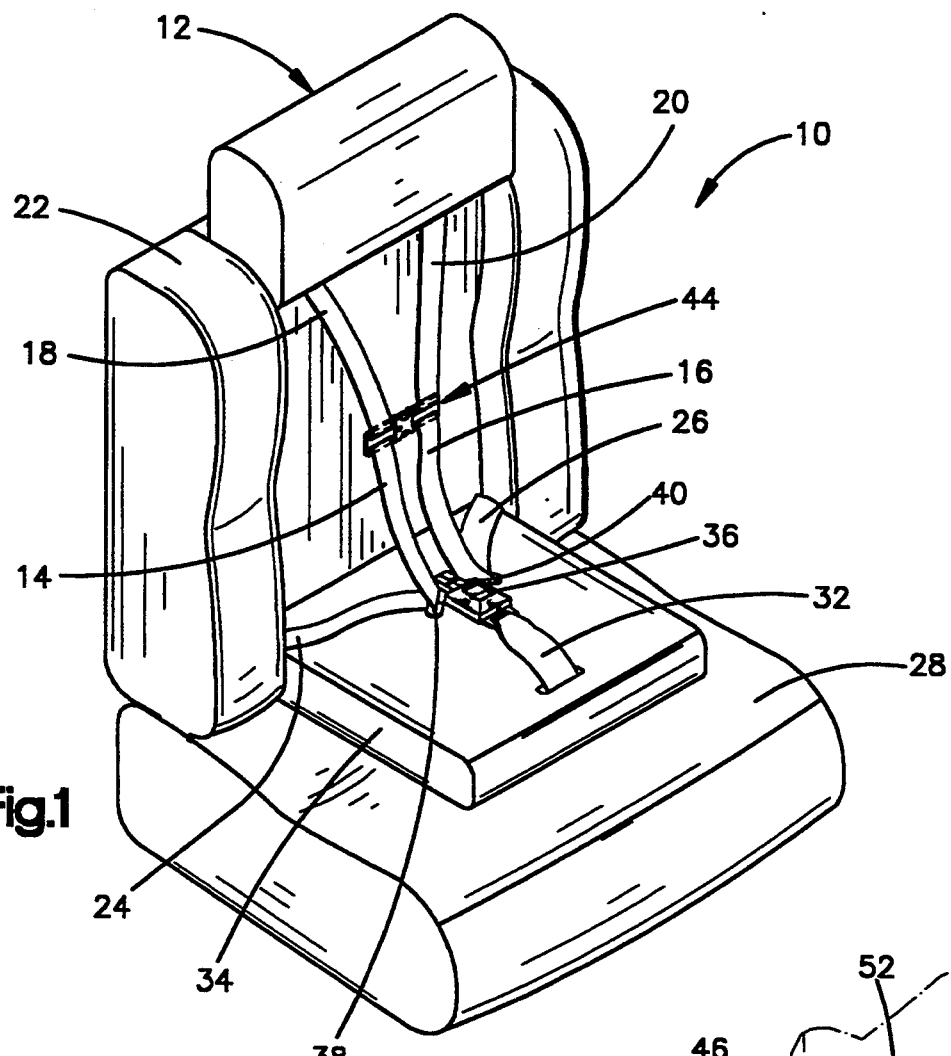
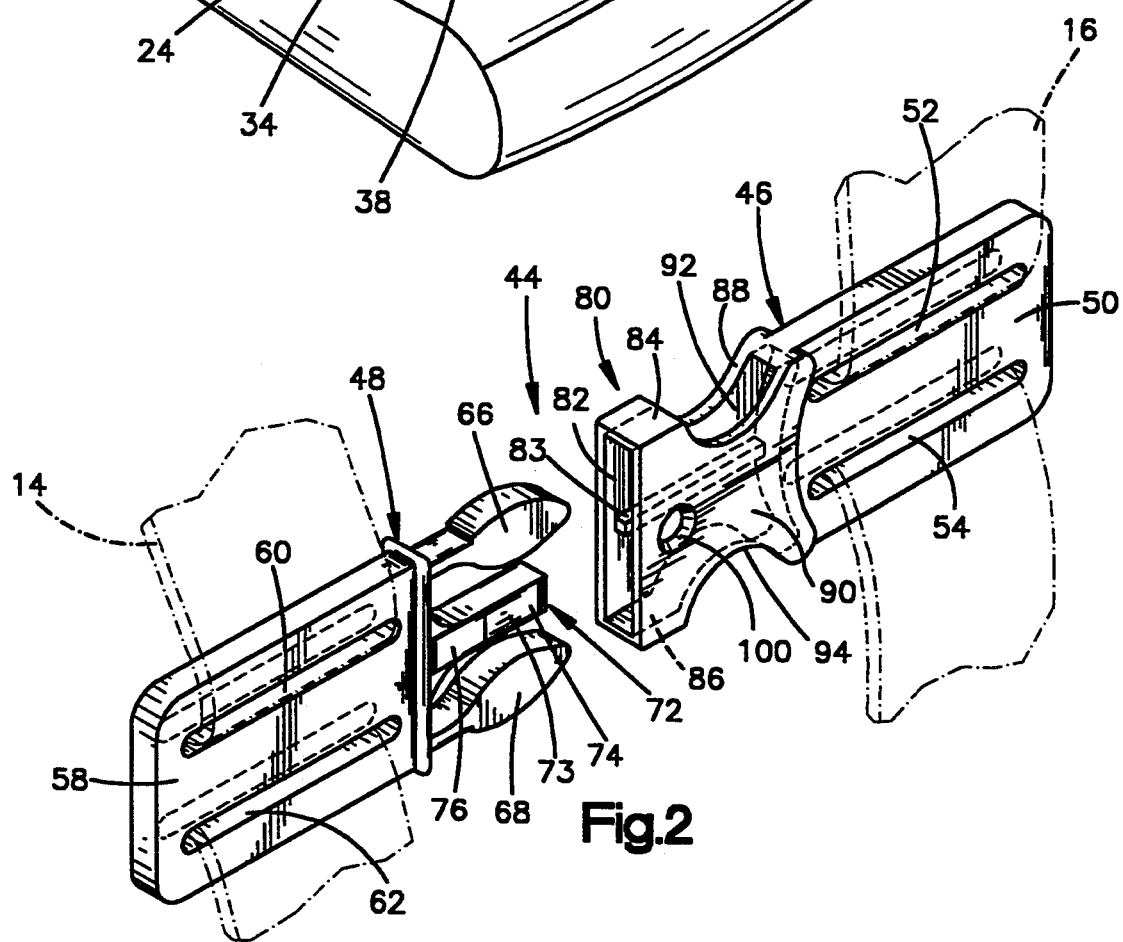

CHEST HARNESS FOR USE IN A CHILD RESTRAINT SYSTEM

FIELD OF THE INVENTION

The present invention relates to a seat belt system, and is particularly directed to a connector assembly for a chest harness in a child restraint system used in a vehicle.

BACKGROUND OF THE INVENTION

Safety seats for children are commonly provided in vehicles. A typical safety seat for a child has a crotch belt to which is attached a buckle that receives either a single tongue connected with a pair of shoulder belts or a pair of tongues connected with a pair of shoulder belts. In order to retain the child securely in the seat, the pair of shoulder belts are interconnected to form a chest harness which is maintained against the shoulders of the child.

SUMMARY OF THE INVENTION

In accordance with a preferred embodiment of the invention, a chest harness is used in a child restraint system in a vehicle. The chest harness includes a connector assembly to interconnect a pair of shoulder belts. The connector assembly includes a buckle member connected to one shoulder belt and a tongue member connected to the other shoulder belt. The buckle member is adjustable along the shoulder belt to which it is connected. Similarly, the tongue member is adjustable along the shoulder belt to which it is connected. After the tongue and buckle members are interconnected, the tongue and buckle members retain the shoulder belts in position against the shoulders of the child.

An indicator is connected with the tongue and buckle members. The indicator includes indicia which may be of first and second colors. The indicia are exposed to view through an opening as the buckle and tongue members are interconnected. The indicia exposed to view through the opening changes from the first color to the second color as the buckle and tongue members are interconnected. Preferably, the first color is red and the second color is green.

BRIEF DESCRIPTION OF THE DRAWINGS

The foregoing and other features of the present invention will become more apparent to one skilled in the art to which the present invention relates upon consideration of the following description of the present invention with reference to the accompanying drawings, wherein:

FIG. 1 is a perspective view illustrating a child restraint system;

FIG. 2 is an enlarged perspective view of a shoulder belt connector assembly used in the restraint system of FIG. 1;

DESCRIPTION OF A PREFERRED EMBODIMENT

Figure 3:
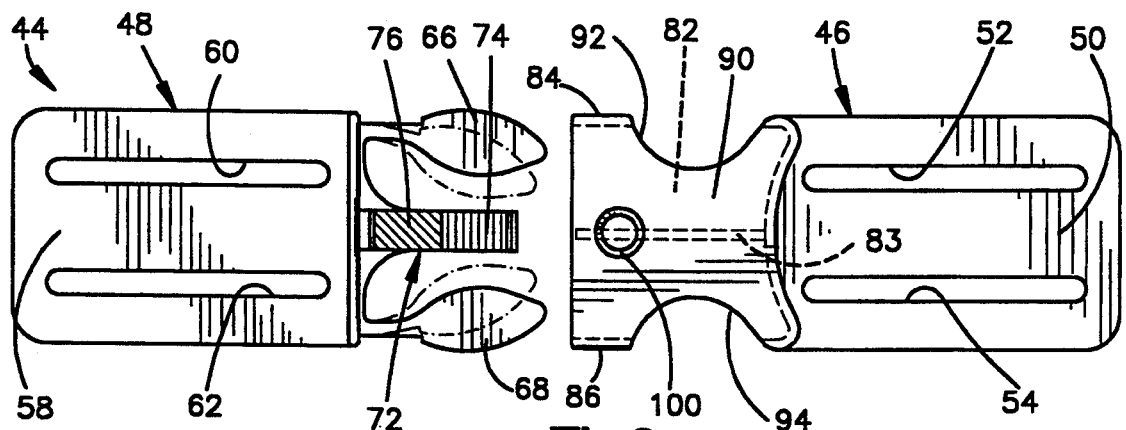
FIG. 3 is a plan view of the shoulder belt connector assembly of FIG. 2.

A child restraint system 10 is illustrated in FIG. 1 in association with a vehicle seat 12. The child restraint system 10 includes a pair of shoulder belts 14, 16. The shoulder belts 14, 16 have upper end portions 18 and 20, respectively, which are secured to a back 22 of the seat 12. The shoulder belts 14, 16 have lower end portions 24 and 26, respectively, which are secured to the seat 12 where the back 22 and a main seat cushion 28 come together. The shoulder belts 14, 16 are associated with respective tongues 38, 40.

A crotch belt 32 extends upwardly from a child seat cushion 34. A buckle 36 is connected to an upper end portion of the crotch belt 32. The buckle 36 receives the pair of tongues 38, 40 to interconnect the shoulder belts 14, 16 and crotch belt 32 in a well known manner. If desired, the shoulder belts 14, 16 could be associated with a single tongue member rather than a pair of tongue members.

A shoulder belt connector assembly 44 is constructed in accordance with the present invention and interconnects the shoulder belts 14, 16 in the manner shown in FIG. 1. The connector assembly 44 includes a buckle member 46 (FIG. 2) and a tongue member 48 which is receivable in the buckle member. The buckle member 46 is formed of a single piece of polymeric material and includes a base portion 50 having a pair of elongated, generally parallel slots 52, 54 through which the shoulder belt 16 extends. The buckle member 46 is adjustable along the shoulder belt 16 by manipulating the buckle member and the shoulder belt so as to move the shoulder belt through the pair of slots 52, 54.

Similarly, the tongue member 48 is formed of a single piece of polymeric material and includes a base portion 58 having a pair of elongated, generally parallel slots 60, 62 through which the other shoulder belt 14 extends. The tongue member 48 is adjustable along the shoulder belt 14 by manipulating the tongue member and the shoulder belt so as to move the shoulder belt through the pair of slots 60, 62.

The tongue member 48 includes a first flexible locking tab portion 66 and a second flexible locking tab portion 68. The first and second locking tab portions 66, 68 extend away from the base portion 58 of the tongue member 48 and generally parallel to one another and to the slots 60, 62. Each of the first and second locking tab portions 66, 68 is resiliently deflectable from an unflexed position (shown in solid lines in FIG. 3) to a flexed position (shown in broken lines in FIG. 3).

Figure 6:
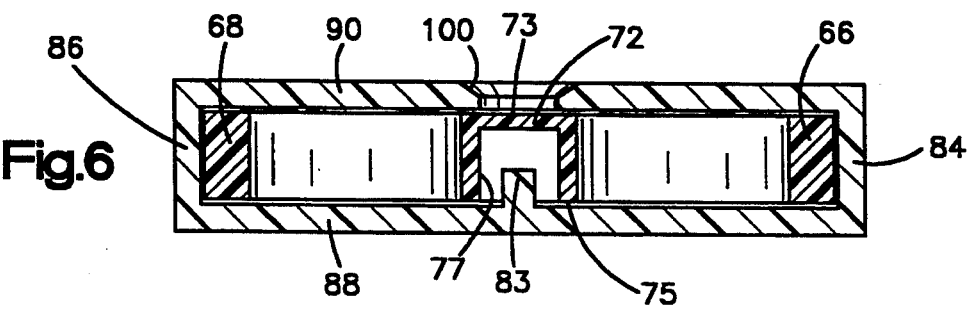
FIG. 6 is a cross-sectional view taken approximately along line 6—6 in FIG. 5.

A generally rectangular-shaped indicator 72 having opposite faces 73, 75 (FIGS. 2 and 6) is located midway between the first and second locking tab portions 66, 68. The indicator 72 extends generally parallel to the locking tab portions 66, 68 and the elongated slots 60, 62. The face 73 of the indicator 72 includes a first portion 74 having a visually readable indicia of a first color and a second portion 76 having a visually readable indicia of a second color. Preferably, the first color is red and the second color is green. As illustrated in the cross-sectional view of FIG. 6, the face 75 of the indicator 72 has a longitudinal slot 77 extending generally parallel to the slots 60, 62 and the first and second locking tab portions 66, 68.

The buckle member 46 includes a generally rectangular housing 80 (FIG. 2) which forms a chamber 82 for receiving the indicator 72 and the first and second locking tab portions 66, 68 of the tongue member 48. The housing 80 has a pair of parallel side walls 84, 86 and a pair of parallel main walls 88, 90. Side openings 92, 94 are formed in the housing 80 adjacent the side walls 84, 86. A longitudinal rib 83 is disposed on one main wall 88 of the housing 80. The longitudinal rib 83 extends generally parallel to the slots 52, 54.

The locking tab portions 66, 68 extend into the side openings 92, 94 when the tongue member 48 is received in the chamber 82 in the buckle member 46. Also, the longitudinal rib 83 of the buckle member 46 engages in and is guided along the longitudinal slot 77 of the indicator 72 when the tongue member 48 is received in the chamber 82 in the buckle member 46. The buckle member 46 has an opening 100 formed in the other main wall 90 of the housing 80. The indicia on the indicator 72 is exposed through the opening 100 as the buckle member 46 and the tongue member 48 are interconnected.

The buckle member 46 and the tongue member 48 can interconnect with each other only when the longitudinal rib 83 is aligned with and engageable in the longitudinal slot 77. This prevents the buckle and tongue members 46, 48 from being interconnected upside down relative to each other and insures that at least one of the indicia on the indicator 72 will be exposed through the opening 100 if the buckle and tongue members 46, 48 are interconnected. The buckle and tongue members 46, 48 cannot be interconnected if the longitudinal rib 83 is not aligned with and engageable in the longitudinal slot 77 because the longitudinal rib 83 interferes with the body of the indicator 72 and thereby prevents the tongue member 48 from being inserted into the chamber 82 of the buckle member 46.

When a child is to be secured by the restraint system 10, the shoulder belts 14, 16 (FIG. 1) are positioned around the shoulders of the child. The crotch belt 32 extends upwardly between the child's legs. The tongue members 38, 40 are then inserted into the buckle 36 to interconnect the shoulder belts 14, 16 and crotch belt 32. The buckle 36 includes a suitable latch mechanism (not shown) to latch the tongue members 38, 40 in the buckle.

Figure 4:
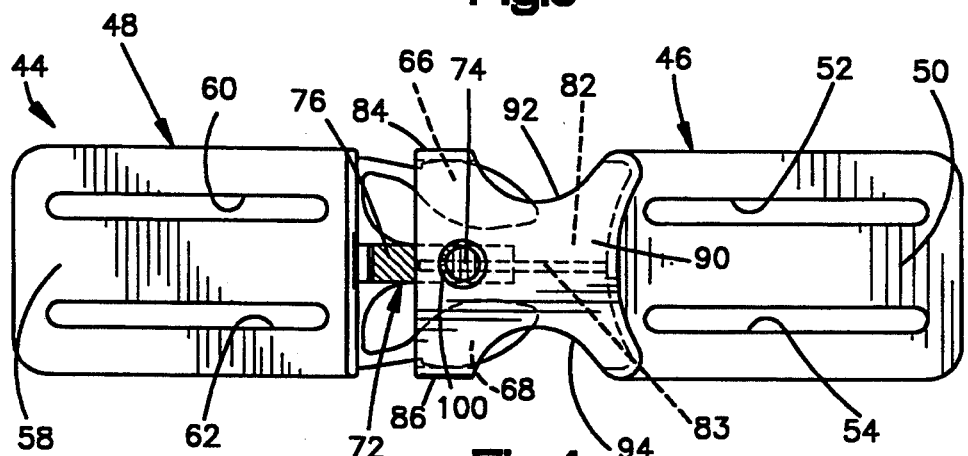
FIG. 4 is a plan view similar to FIG. 3, illustrating a tongue member of the shoulder belt connector assembly partially inserted in a buckle member of the shoulder belt assembly.
Figure 5:
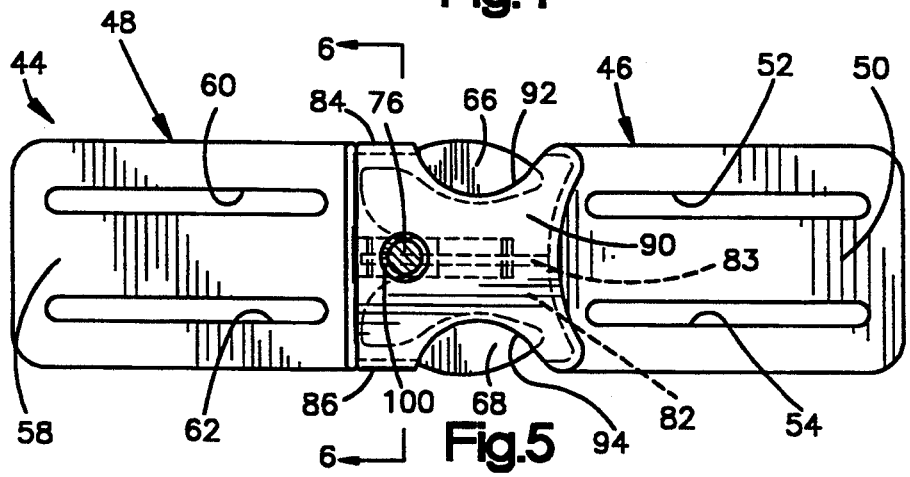
FIG. 5 is a view similar to FIG. 4, illustrating the tongue member fully inserted into the buckle member.

After the tongue members 38, 40 are latched in the buckle 36, the tongue member 48 of the connector assembly 44 is inserted into the buckle member 46 of the connector assembly to latch the tongue member 48 in the buckle member 46. The tongue member 48 and the buckle member 46 are shown in FIGS. 2 and 3 in an unlatched position. The tongue member 48 is shown in FIG. 4 partially inserted in the buckle member 46. The tongue member 48 is shown in FIG. 5 fully inserted in the buckle member 46.

As insertion of the tongue member 48 into the buckle member 46 is begun, the locking tab portions 66, 68 are resiliently deflected inward from the position shown in FIG. 3 toward the position shown in FIG. 4 by engagement with the side walls 84, 86. In other words, the first and second locking tab portions 66, 68 are cammed inward from their unflexed positions (shown in solid lines in FIG. 3) toward their flexed positions (shown in broken lines in FIG. 3) by the side walls 84, 86 of the buckle 46. At the same time, the indicator 72 moves into the chamber 82 formed in the buckle member 46. As the indicator 72 moves into the chamber 82, the red color on the first portion 74 aligns with the opening 100 and is thereby exposed through the opening. At this time, the green color on the second portion 76 is at least partially covered by the main wall 90 of the buckle member 46.

Continued insertion of the tongue member 48 into the buckle member 46 moves the locking tab portions 66, 68 and the indicator 72 further into the buckle member 46. When the tongue member 48 is fully inserted into the buckle member 46, as shown in FIG. 5, the first and second locking tab portions 66, 68 return to their unflexed positions and thereby latch the tongue member 48 in the buckle member 46. In other words, the locking tab portions 66, 68 resiliently spring outward into the side openings 92, 94 and engage the side walls 84, 86 to hold the tongue member 48 in the buckle member 46.

When the tongue member 48 is fully inserted and latched in the buckle member 46, the green color on the second portion 76 of the indicator 72 aligns with the opening 100 and is thereby exposed through the opening. At this time, the red color on the first portion 74 is covered by the main wall 90 of the buckle member 46. If the tongue member 48 should not be fully inserted and latched in the buckle member 46, the indicia which is visible through the opening 100 will either remain entirely red or will be partially red and partially green.

To disconnect the tongue member 48 from the buckle member 46, the first and second locking tab portions 66, 68 are manually squeezed to flexed positions (shown in broken lines in FIG. 3) while the tongue member 48 is manually pulled away from the buckle member 46 with the other hand. When the first and second locking tab portions 66, 68 are squeezed a sufficient amount, the tongue member 48 unlatches from the buckle member 46. As the tongue member 48 unlatches from the buckle member 46, the tongue member 48 moves away from the buckle member 46 due to the manual pulling force applied to the tongue member. As the tongue member 48 moves away from the buckle member 46, the indicia visible through the opening 100 changes from green back to red.

It should be understood that although the indicator 72 has been disclosed as being part of the tongue member 48, the indicator 72 could be part of the buckle member 46 if desired. If this should be the case, the opening 100 would be formed in the tongue member 48.

In the illustrated embodiment of the invention, the indicia on the first portion 74 of the indicator 72 is a uniform area of the color red, and the indicia on the second portion 76 of the indicator is a uniform area of the color green. If desired, colored or plain letters could be substituted for the red and green indicia. Although the child restraint system 10 has been illustrated in FIG. 1 as being permanently installed in association with a child seat portion of a vehicle seat 12, the child restraint system could be used in association with a child seat which is separate from the vehicle seat and is portable. Also, although the invention has been disclosed as being used in a child restraint system 10, the invention could be used in other restraint systems having a safety belt.

From the above description of the invention, those skilled in the art to which the present invention relates, will perceive improvements, changes and modifications. Such improvements, changes and modifications within the skill of the art to which the present invention relates are intended to be covered by the appended claims.

Having described the invention, the following is claimed:

1. An apparatus for use with a safety belt, said apparatus comprising:
   a tongue member;
   a buckle member for receiving said tongue member to interconnect said buckle member and tongue member; and
   indicator means for indicating when said members are interconnected, said indicator means including first and second indicia connected with a first one of said members and surface means forming an opening connected with a second one of said members, said first indicia being viewable through said opening when said tongue member is less than fully inserted into said buckle member, only said second indicia being viewable through said opening when said tongue member is fully inserted into said buckle member.

2. An apparatus as set forth in claim 1 wherein said tongue member includes a pair of locking tabs which are engageable with said buckle member, said means being located between said locking tabs.

3. An apparatus as set forth in claim 1 further including means associated with said indicator means for enabling said tongue member to be inserted into said buckle member only when said members are in a predetermined alignment relative to each other.

4. A connector assembly for interconnecting shoulder belts in a child restraint system in a vehicle, said connector assembly comprising:
   a tongue member having a pair of slots for receiving a shoulder belt; and
   a buckle member for receiving said tongue member to interconnect said buckle member and said tongue member, said buckle member having a pair of slots for receiving another shoulder belt;
   each of said members being adjustable along its associated shoulder belt to position said members relative to a child in the vehicle; and
   indicator means for indicating when said members are interconnected, said indicator means including first indicia of a first color and second indicia of a second color connected with a first one of said members and surface means forming an opening connected with a second one of said members, said indicia of a first color being viewable through said opening when said tongue member is less than fully inserted into said buckle member, said indicia of a second color being viewable through said opening when said tongue member is fully inserted into said buckle member.

5. A connector assembly as set forth in claim 4 wherein said first and second indicia are connected with said tongue member and said surface means for forming an opening is connected with said buckle member, said first and second indicia being received in said buckle member when said tongue member is fully inserted into said buckle member.

6. A connector assembly as set forth in claim 4 wherein said tongue member includes a pair of locking tabs which are engageable with said buckle member to retain said tongue and buckle members against relative movement when said tongue member is fully inserted into said buckle member, said first and second indicia being disposed between said locking tabs.

7. A connector assembly as set forth in claim 4 further including means associated with said indicator means for enabling said tongue member to be inserted into said buckle member only when said members are in a predetermined alignment relative to each other.

8. An apparatus for use with a safety belt, said apparatus comprising:
   a tongue member including a pair of locking tabs which are resiliently deflectable relative to each other;
   a buckle member for receiving said pair of locking tabs of said tongue member to interconnect said buckle member and said tongue member, said buckle member including surface means for resiliently deflecting said locking tabs toward each other as said tongue member is inserted into said buckle member and for allowing said locking tabs to move away from each other to move into gripping engagement with said buckle member when said tongue member is fully inserted into said buckle member; and
   indicator means for indicating when said members are interconnected, said indicator means being at least partially disposed between said locking tabs and being receivable in said buckle member upon insertion of said tongue member into said buckle member, said indicator means including a first surface on which first indicia is disposed and a second surface on which second indicia is disposed, said first surface being in a first plane and said second surface lying in a second plane which is parallel with said first plane, said first and second indicia being different from each other.

9. An apparatus as set forth in claim 8 wherein said first indicia is viewable when said tongue member is less than fully inserted into said buckle member, said second indicia is viewable and said first indicia is hidden from view when said tongue member is fully inserted into said buckle member.

10. An apparatus as set forth in claim 8 further including means associated with said indicator means for enabling said tongue member to be inserted into said buckle member only when said members are in a predetermined alignment relative to each other.

11. An apparatus for use with a safety belt, said apparatus comprising:
    a tongue member;
    a buckle member for receiving said tongue member to interconnect said buckle member and tongue member; and
    indicator means for indicating when said members are interconnected, said indicator means including first and second indicia connected with a first one of said members and surface means forming an opening connected with a second one of said members, said first indicia being viewable through said opening when said tongue member is less than fully inserted into said buckle member, said second indicia being viewable through said opening when said tongue member is fully inserted into said buckle member;
    said first indicia including a surface area of a first color and said second indicia including a surface area of a second color, said surface area of the first color being viewable through said opening when said tongue member is less than fully inserted into said buckle member, only said surface area of the second color being viewable through said opening when said tongue member is fully inserted into said buckle member.

12. An apparatus as set forth in claim 11 wherein said surface area of the first color and said surface area of the second color move relative to said opening as said tongue member is inserted into said buckle member.

13. An apparatus as set forth in claim 11 wherein said surface area of the first color and said surface area of the second color are connected with said tongue member.

14. An apparatus for use with a safety belt, said apparatus comprising:

a tongue member including a pair of locking tabs which are resiliently deflectable relative to each other;

a buckle member for receiving said pair of locking tabs of said tongue member to interconnect said buckle member and said tongue member, said buckle member including surface means for resiliently deflecting said locking tabs toward each other as said tongue member is inserted into said buckle member and for allowing said locking tabs to move away from each other to move into gripping engagement with said buckle member when said tongue member is fully inserted into said buckle member; and indicator means for indicating when said members are interconnected, said indicator means being at least partially disposed between said locking tabs and being receivable in said buckle member upon insertion of said tongue member into said buckle member;

said indicator means including first and second indicia connected with said tongue member and disposed between said locking tabs, said first indicia being viewable when said tongue member is less than fully inserted into said buckle member, said second indicia being viewable and said first indicia being hidden from view when said tongue member is fully inserted into said buckle member, said first indicia including a surface area of a first color and said second indicia includes a surface area of a second color.

15. An apparatus for use with a safety belt, said apparatus comprising:

a tongue member including locking tabs which are resiliently deflectable relative to each other;

a buckle member for receiving said locking tabs of said tongue member to interconnect said buckle member and said tongue member, said buckle member including surface means for resiliently deflecting said locking tabs as said tongue member is inserted into said buckle member and for allowing said locking tabs to move into gripping engagement with said buckle member when said tongue member is fully inserted into said buckle member; and indicator means comprising a structure other than said locking tabs for indicating when said members are interconnected, said indicator means being receivable in said buckle member upon insertion of said tongue member into said buckle member, said indicator means including a first surface on which first indicia is disposed and a second surface on which second indicia is disposed, said first and second indicia being different from each other.

* * * * *

UNITED STATES PATENT AND TRADEMARK OFFICE
CERTIFICATE OF CORRECTION

PATENT NO. : 5,380,067
DATED : January 10, 1995
INVENTOR(S) : William W. Turvill and Bob L. McFalls It is certified that error appears in the above-indentified patent and that said Letters Patent is hereby corrected as shown below:

Column 5, line 20, after "said" (second occurence) insert --indicator--.

Signed and Sealed this

Eleventh Day of July, 1995

Attest:

BRUCE LEHMAN

Attesting Officer        Commissioner of Patents and Trademarks